United States Patent
Shoji

(10) Patent No.: US 9,449,394 B2
(45) Date of Patent: Sep. 20, 2016

(54) IMAGE SYNTHESIS DEVICE, IMAGE SYNTHESIS SYSTEM, IMAGE SYNTHESIS METHOD AND PROGRAM

(71) Applicant: National University Corporation Yokohama National University, Kanagawa (JP)

(72) Inventor: Michihiko Shoji, Kanagawa (JP)

(73) Assignee: NATIONAL UNIVERSITY CORPORATION YOKOHAMA NATIONAL UNIVERSITY, Kanagawa (JP)

(*) Notice: Subject to any disclaimer, the term of this patent is extended or adjusted under 35 U.S.C. 154(b) by 0 days.

(21) Appl. No.: 14/417,697

(22) PCT Filed: Jul. 30, 2013

(86) PCT No.: PCT/JP2013/070624
§ 371 (c)(1),
(2) Date: Jan. 27, 2015

(87) PCT Pub. No.: WO2014/021326
PCT Pub. Date: Feb. 6, 2014

(65) Prior Publication Data
US 2015/0193940 A1 Jul. 9, 2015

(30) Foreign Application Priority Data
Jul. 30, 2012 (JP) ................................ 2012-168362

(51) Int. Cl.
*G06K 9/34* (2006.01)
*G06T 7/00* (2006.01)
(Continued)

(52) U.S. Cl.
CPC ........... *G06T 7/0081* (2013.01); *A63F 13/216* (2014.09); *G06T 7/0085* (2013.01); *G06T 19/006* (2013.01)

(58) Field of Classification Search
CPC . G06T 19/006; G06T 7/0081; G06T 7/0085; G06T 5/20; G06T 5/001

USPC .......................................................... 382/173
See application file for complete search history.

(56) References Cited

U.S. PATENT DOCUMENTS 5,274,453 A * 12/1993 Maeda .................... H04N 5/272
348/409.1
6,317,513 B2 * 11/2001 Michael ........................ 382/145
(Continued)

FOREIGN PATENT DOCUMENTS

| JP | 2004234253 | 8/2004 |
| JP | 2005107969 | 4/2005 |

(Continued)

OTHER PUBLICATIONS

International Search Report, PCT/JP2013/070624 mailed Aug. 27, 2013.

*Primary Examiner* — Ali Bayat
(74) *Attorney, Agent, or Firm* — Thomas | Horstemeyer, LLP

(57) ABSTRACT

An image synthesis device includes a real image acquisition unit configured to acquire a real image, a post-substitution object image acquisition unit configured to acquire a post-substitution object image that is substituted for a pre-substitution object image included in the real image and synthesized with the real image, a masking object image region detection unit configured to detect a region of a masking object image that masks the pre-substitution object image in the real image, a masked portion cut-out unit configured to cut out a portion corresponding to the region of the masking object image from the post-substitution object image, and a synthesis execution unit configured to perform the synthesis of the post-substitution object image which the portion corresponding to the region of the masking object image has been cut out from the real image.

6 Claims, 11 Drawing Sheets

(51) Int. Cl.
*A63F 13/216* (2014.01)
*G06T 19/00* (2011.01)

(56) References Cited

U.S. PATENT DOCUMENTS

| | | | | |
|---|---|---|---|---|
| 2003/0107781 A1* | 6/2003 | Ozawa | ............... | H04N 1/3871 358/506 |
| 2005/0134622 A1* | 6/2005 | Yamaguchi | ............ | G06T 1/0028 347/15 |
| 2008/0095466 A1* | 4/2008 | Kinrot | .................. | G06T 1/0007 382/284 |
| 2009/0080741 A1* | 3/2009 | Shinagawa | ........ | G01R 33/5601 382/131 |
| 2012/0154581 A1* | 6/2012 | Wang | ................... | G02B 29/046 348/143 |
| 2015/0016746 A1* | 1/2015 | Tsubota | .................... | G06T 3/00 382/275 |

FOREIGN PATENT DOCUMENTS

| JP | 4083684 | 4/2008 |
|---|---|---|
| JP | 2009134693 | 6/2009 |
| WO | 03063086 | 7/2003 |

\* cited by examiner

IMAGE SYNTHESIS DEVICE, IMAGE SYNTHESIS SYSTEM, IMAGE SYNTHESIS METHOD AND PROGRAM

TECHNICAL FIELD

The present invention relates to an image synthesis device, an image synthesis system, an image synthesis method, and a program.

Priority is claimed on Japanese Patent Application No. 2012-168362, filed Jul. 30, 2012, the content of which is incorporated herein by reference.

BACKGROUND ART

As a method of increasing human-friendliness by giving a robot an appearance similar to a human or animal (hereinafter referred to as a "human or the like"), a method of substituting an image of a human or the like for an image of a robot using technology of mixed reality is considered.

In this method, it is possible to reduce the cost or time necessary to design/manufacture the robot because it is unnecessary to make the appearance of the robot similar to the appearance of a human or the like when the robot is manufactured. In addition, the appearance can also be easily changed by changing image data to be synthesized.

Here, it can be viewed as if there is a human or the like even in a space in which there is no human or the like by synthesizing a virtual human or the like with a real image without using the robot. However, in this method, finding a positional relationship of a real object with the virtual human or the like becomes problematic.

For example, when an observer (a person who views a synthesized image) has held out his/her hand toward the position of the virtual human or the like, it is necessary to control a display/non-display of a virtual human or the like in an overlapping portion so as to represent the front-rear relation of overlapping between the hand viewed by the observer and the virtual human or the like. Also, hereinafter, the front-rear relation of overlapping objects (including a virtual object) when viewed by the observer is referred to as a "masking relationship."

For example, a time of flight (TOF) method is a method of measuring a position of a real object (a distance from a point in view of the observer) such as the observer's hand so as to find this masking relationship. In the TOF method, light is radiated from a light source to a subject (a real object such as the observer's hand) and reflected light is detected by an optical sensor. Then, based on a time until the reflected light is detected after the light is radiated (TOF of the light), a distance between the light source or sensor and the subject is measured.

However, when the masking relationship is found using the TOF method, a precise device for performing the TOF method becomes necessary and the manufacturing cost of the device increases.

On the other hand, in the above-described method of substituting the image of the human or the like for the image of the robot (real object), the position of the robot shows a position of the virtual human or the like. Accordingly, it is possible to find the front-rear relation of the virtual human or the like and the observer's hand by finding the front-rear relation of the robot and the observer's hand, and a device or the like for performing the TOF method is unnecessary.

In addition, in the above-described method of substituting the image of the human or the like for the image of the robot, it is possible to provide a tactile sensation when the observer is in contact with the robot.

However, in the above-described method of substituting the image of the human or the like for the image of the robot, processing of different parts of a shape of the image of the robot and a shape of the image of the virtual human or the like becomes problematic. This point will be described with reference to FIGS. 11 to 13.

FIG. 11 is an explanatory diagram illustrating an example of a real image, and includes an image I1101 of a user's hand and an image I1102 of a robot. In addition, FIG. 12 is an explanatory diagram illustrating a human image (for example, an example of computer graphics (CG)) to be synthesized. In addition, FIG. 13 is an explanatory diagram illustrating an example of an image obtained from a synthesis result. The image of FIG. 13 is synthesized by substituting the human image of FIG. 12 for a region portion of the image I1102 of the robot using chroma key technology in the real image of FIG. 11.

In FIG. 13, a portion protruding from the region of the image I1102 of the robot is clipped from the human image according to a difference between a shape of the image I1102 (FIG. 11) of the robot and a shape of the human image (FIG. 12). An uncomfortable feeling is given to the observer according to this partial clipping of the human image. In addition, when the region of the image I1102 of the robot is larger than the region of the human image in contrast to the example of FIG. 13, a portion other than the human image of the image of FIG. 12 is included in a synthesized image. For example, if the portion other than the human image is masked in the image of FIG. 12, image information of a protrusion region of the image I1102 of the robot is omitted in the synthesized image. According to the incorporation of the portion other than the human image (for example, the omission of the image information), the uncomfortable feeling is given to the observer as in the case in which the human image is partially clipped.

As one countermeasure for this problem, there is a method using an image processing system disclosed in Patent Literature 1. The image processing system disclosed in Patent Literature 1 includes an image selection device for selecting CG of a form of a real object and a form suitable for a positional relationship between the observer who views the real object and the real object, a halo generation device for generating a halo image around the CG, a synthesized image generation device for generating a synthesized image of the CG and the halo image, and an image display processing device for displaying the synthesized image on a display viewed by the observer so that the synthesized image is superimposed on the real object.

When the image of the virtual human or the like is substituted for the image of the robot in the real image using the image processing system, the size of the image of the human or the like is configured to be slightly less than the size of the image of the robot. Then, the halo image is displayed in the synthesized image for a region of the image of the robot protruding from the image of the human or the like and the uncomfortable feeling for the observer can be reduced.

CITATION LIST

Patent Literature

[Patent Literature 1]
Japanese Patent No. 4083684

SUMMARY OF INVENTION

Technical Problem

Here, it is possible to further reduce an uncomfortable feeling for an observer if it is possible to further make a display of a halo image unnecessary.

The present invention provides an image synthesis device, an image synthesis system, an image synthesis method, and a program capable of performing image synthesis corresponding to a masking relationship of an object at comparatively low cost and further reducing an uncomfortable feeling for an observer.

Solution to Problem

An image synthesis device according to one aspect of the present invention is an image synthesis device including: a real image acquisition unit configured to acquire a real image; a post-substitution object image acquisition unit configured to acquire a post-substitution object image that is substituted for a pre-substitution object image included in the real image and synthesized with the real image; a masking object image region detection unit configured to detect a region of a masking object image that masks the pre-substitution object image in the real image; a masked portion cut-out unit configured to cut out a portion corresponding to the region of the masking object image from the post-substitution object image; and a synthesis execution unit configured to perform the synthesis of the post-substitution object image which the portion corresponding to the region of the masking object image has been cut out from the real image.

In addition, in the above-described image synthesis device, the image synthesis device according to another aspect of the present invention includes a region segmentation unit configured to segment the real image into regions by performing edge extraction on the real image, wherein the masking object image region detection unit detects a region that at least a part of the regions segmented by the region segmentation unit masks the pre-substitution object image as a region of the masking object image.

In addition, in the above-described image synthesis device, the image synthesis device according to another aspect of the present invention includes a non-masking-time image acquisition unit configured to acquire the pre-substitution object image when there is no masking by the masking object image; and a masked region detection unit configured to detect a region masked by the masking object image from the pre-substitution object image by obtaining a difference between the pre-substitution object image when the masking by there is no masking object image and the pre-substitution object image excluding a portion masked by the masking object image, wherein the masking object image region detection unit detects a region including the region detected by the masked region detection unit among regions into which the real image is segmented.

In addition, for the image synthesis device according to another aspect of the present invention, in the above-described image synthesis device, the masked portion cut-out unit generates an image of a portion corresponding to the pre-substitution object image excluding a portion masked by the masking object image from the post-substitution object image and an image of a portion excluding a portion corresponding to the pre-substitution object image and a portion corresponding to the masking object image from the post-substitution object image.

In addition, an image synthesis system according to another aspect of the present invention is an image synthesis system including an imaging device, an image synthesis device, and a display device, wherein the image synthesis device includes a real image acquisition unit configured to acquire a real image captured by the imaging device, a post-substitution object image acquisition unit configured to acquire a post-substitution object image that is substituted for a pre-substitution object image included in the real image and synthesized with the real image, a masking object image region detection unit configured to detect a region of a masking object image that masks the pre-substitution object image in the real image, a masked portion cut-out unit configured to cut out a portion corresponding to the region of the masking object image from the post-substitution object image, and a synthesis execution unit configured to perform the synthesis of the post-substitution object image which the portion corresponding to the region of the masking object image has been cut out from the real image, and wherein the display device displays an image synthesized by the synthesis execution unit.

In addition, an image synthesis method according to another aspect of the present invention is an image synthesis method of an image synthesis device including a real image acquisition step of acquiring a real image, a post-substitution object image acquisition step of acquiring a post-substitution object image that is substituted for a pre-substitution object image included in the real image and synthesized with the real image, a masking object image region detection step of detecting a region of a masking object image that masks the pre-substitution object image in the real image, a masked portion cut-out step of excluding a portion corresponding to the region of the masking object image from the post-substitution object image, and a synthesis execution step of performing the synthesis of the post-substitution object image from which the portion corresponding to the region of the masking object image has been cut out from the real image.

In addition, a program according to another aspect of the present invention is a program for causing a computer serving as an image synthesis device to execute a real image acquisition step of acquiring a real image, a post-substitution object image acquisition step of acquiring a post-substitution object image that is substituted for a pre-substitution object image included in the real image and synthesized with the real image, a masking object image region detection step of detecting a region of a masking object image that masks the pre-substitution object image in the real image, a masked portion cut-out step of excluding a portion corresponding to the region of the masking object image from the post-substitution object image, and a synthesis execution step of performing the synthesis of the post-substitution object image which the portion corresponding to the region of the masking object image has been cut out from the real image.

Advantageous Effects of Invention

According to the present invention, it is possible to perform image synthesis corresponding to a masking relationship of an object at a comparatively low cost and further reduce an uncomfortable feeling for an observer.

DESCRIPTION OF EMBODIMENTS

The present invention will be hereinafter described through embodiments of the invention, but the following embodiments do not limit the invention claimed in the attached claims. Also, all combinations of features described in the embodiments are not essential to the solving means of the invention.

Figure 1:
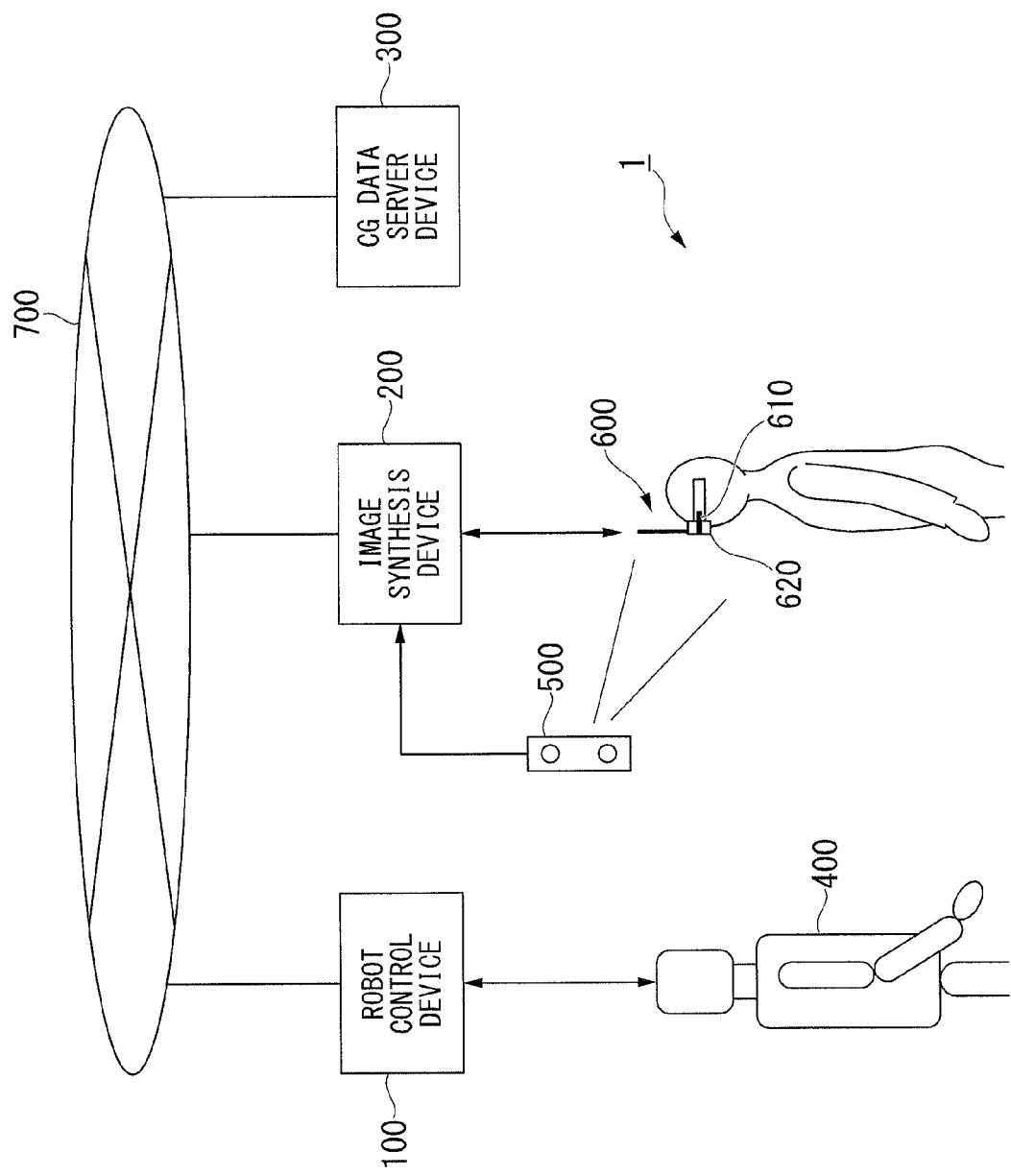
FIG. 1 is a schematic configuration diagram illustrating a device configuration of an image generation system in an embodiment of the present invention.

FIG. 1 is a schematic configuration diagram illustrating a device configuration of an image generation system in an embodiment of the present invention. In FIG. 1, the image synthesis system 1 includes a robot control device 100, an image synthesis device 200, a CG data server device 300, a robot 400, a sensor 500, a head-mounted display (HMD) 600, and a network 700. The HMD 600 includes an imaging device 610 and a display device 620.

The robot control device 100, the image synthesis device 200, and the CG data server device 300 are connected to the network 700 to be communicable. In addition, the robot control device 100 and the robot 400 are capable of wireless communication. In addition, the image synthesis device 200 and the sensor 500 are connected by wire to be communicable. In addition, the image synthesis device 200 and the HMD 600 are capable of wireless communication.

The image synthesis system 1 is a system for generating an image of mixed reality and synthesizes an image of an object which is not actually positioned with a real image (an image obtained by imaging a real space) captured by the HMD 600.

Also, a character is included in the object used here. Accordingly, the image synthesis system 1 may be configured to synthesize the image of the character that is not actually positioned with the real image captured by the HMD 600.

In addition, the image used here is an image showing the appearance of the object.

The robot control device 100 controls and operates the robot 400 and transmits posture information of the robot 400 to the image synthesis device 200. The robot control device 100, for example, is implemented by a personal computer (PC). Alternatively, the robot control device 100 may be implemented by a microcomputer.

Also, although the case in which the robot 400 remains at the same position and changes a posture has been described in this embodiment, the robot 400 may be configured to perform movement such as autonomous walking. In this case, the robot control device 100 controls the posture and position of the robot 400 and transmits position information and posture information of the robot 400 to the image synthesis device 200.

The robot 400 is an example of a pre-substitution object (an object of an image for which the image synthesis device 200 substitutes another image) in this embodiment. The robot 400 is provided to calculate a position of the object for which the image synthesis device 200 synthesizes an image with the real image. That is, the image synthesis device 200 synthesizes an image in which another object is substituted for the robot 400. For example, the appearance of the robot 400 is monochromatically configured, and the image synthesis device 200 substitutes another image for the image of the robot 400 using the chroma key technology.

Also, the pre-substitution object in this embodiment is not limited to the robot. Various objects having appearances can be used as the pre-substitution object.

The sensor 500 detects a position and a posture (direction of a face) of a head portion (head or face) of a user (an observer who wears the HMD 600 and views a synthesized image), and outputs information (hereinafter referred to as "sensor information) of the detected position and posture to the image synthesis device 200.

Here, various sensors can be used as the sensor 500. For example, the sensor 500 may be configured to calculate a position and posture of the head portion of the user by radiating infrared rays or ultrasonic waves and analyzing reflected waves. Alternatively, the sensor 500 may be configured to capture an image of the head portion of the user and calculate the position and posture of the head portion of the user by image recognition. Alternatively, the sensor 500 may be configured to include a gyro sensor mounted on the HMD 600 and calculate the position and posture of the head portion of the user based on an angle and acceleration detected by the gyro sensor.

Also, a method of detecting the position and posture of the head portion of the user is not limited to a method using the sensor 500. For example, a mark serving as a position marker may be arranged in place of the sensor 500 and the image synthesis device 200 may be configured to calculate the position and posture of the head portion of the user from a size and distortion of an image of the mark included in the image captured by the HMD 600 (imaging device 610).

The image synthesis device 200 acquires a real image captured by the HMD 600. Then, the image synthesis device 200 synthesizes an image obtained by substituting an image output by the CG data server device 300 for the image of the robot 400 included in the real image and causes the HMD 600 to display the synthesized image. The image synthesis device 200, for example, is implemented by a PC.

Here, with reference to FIGS. 2 to 4, an example of the image to be synthesized by the image synthesis device 200 will be described.

Figure 2:
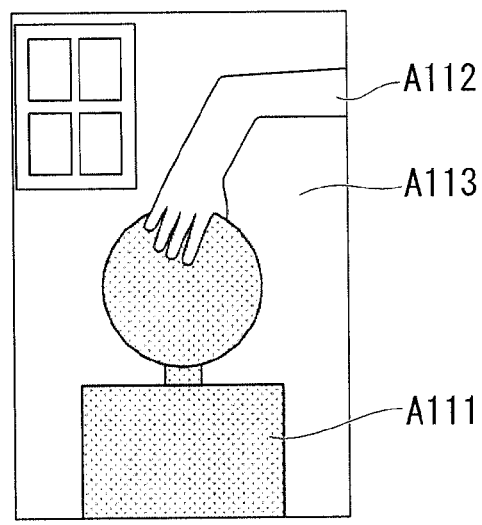
FIG. 2 is an explanatory diagram illustrating an example of a real image captured by a head-mounted display in the embodiment.

FIG. 2 is an explanatory diagram illustrating an example of a real image captured by the HMD 600. The real image illustrated in FIG. 2 is an image obtained by imaging a state in which the user has held out his/her hand to the robot 400. This real image includes a region A111 of an image of the robot 400, a region A112 of an image of the user's hand masking the image of the robot 400, and a region A113 of a background image.

Figure 3:
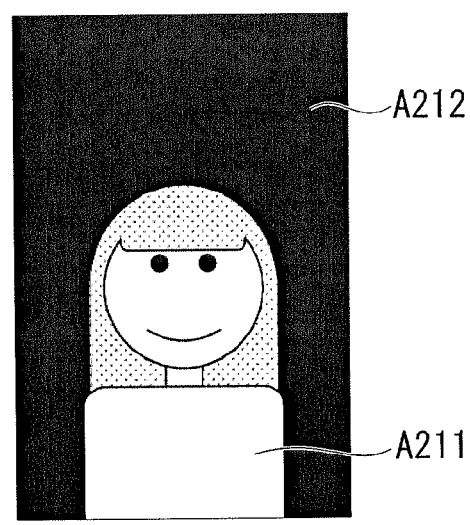
FIG. 3 is an explanatory diagram illustrating an example of an image with which an image synthesis device synthesizes a real image in the embodiment.

FIG. 3 is an explanatory diagram illustrating an example of an image with which the image synthesis device 200 synthesizes a real image. The image illustrated in FIG. 3 includes an image A211 of a synthesis target and a background region A212 becomes a non-background (for example, black monochromatic).

Also, hereinafter, the object in which the image synthesis device 200 synthesizes the image with the real image is a "post-substitution object," and the image of the post-substitution object is referred to as a "post-substitution object image." The post-substitution object is not limited to the character illustrated in FIG. 3. Images of various objects having appearances capable of being visually displayed can be set as post-substitution objects. In addition, the post-substitution object may be a real object or a fictitious object.

Figure 4:
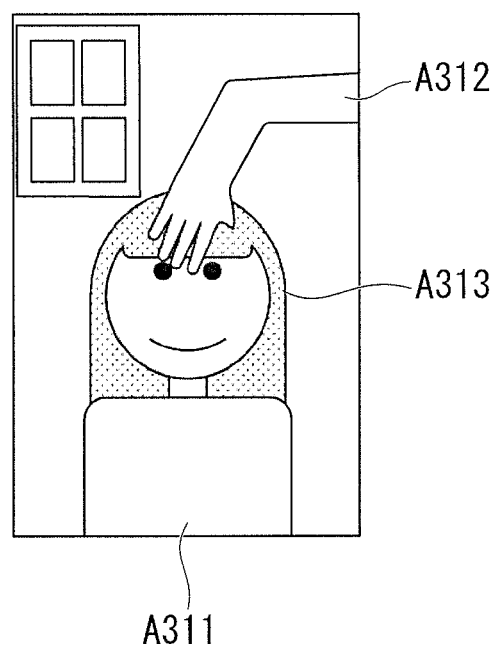
FIG. 4 is an explanatory diagram illustrating an example of an image generated (synthesized) by the image synthesis device in the embodiment.

FIG. 4 is an explanatory diagram illustrating an example of an image generated (synthesized) by the image synthesis device 200. The image illustrated in FIG. 4 is an image obtained by substituting the image of the character illustrated in FIG. 3 for the image of the robot 400 in the real image of FIG. 2, and includes a region A311 of the image of the character, a region A312 of an image of the user's hand, and a region A313 of a background image.

Here, although the image of the character illustrated in FIG. 4 has a different shape from the image of the robot illustrated in FIG. 2, a similar masking relationship to the case of FIG. 2 is maintained. That is, the hand of the user masks part of the character (the image of the user's hand overlaps in front of the image of the character and part of the character image is masked). In addition, the user's hand and the character mask part of a wall of the background (the image of the hand of the user and the image of the character overlap in front of the image of the wall of the background and part of the image of the wall is masked).

In this manner, the image synthesis device 200 maintains the masking relationship in the real image captured by the HMD 600 and substitutes the image of the post-substitution object for the image of the pre-substitution object.

The CG data server device 300 can output images of various postures of the character that is the post-substitution object. Then, the CG data server device 300 provides the image synthesis device 200 with an image of a posture according to the posture of the robot viewed by the user according to the posture of the robot 400 detected by the robot control device 100 and the position and posture of the head portion of the user detected by the sensor 500.

Specifically, the CG data server device 300 stores a three-dimensional (3D) model that is the post-substitution object in advance. The 3D model is 3-Dimensional computer graphics (3DCG) in which a side surface or a rear surface as well as a front surface is also three-dimensionally created. In addition, this 3D model is provided with a skeleton having a joint and it is possible to adjust a pose by setting a joint angle.

Then, the CG data server device 300 acquires the joint angle of the robot 400 and adjusts the pose of the 3D model of the character to a pose corresponding to the joint angle. Further, the CG data server device 300 acquires a snapshot (two-dimensional (2D) image) of the character (post-substitution object) in which the size and direction are adjusted based on a positional relationship between the robot 400 and the user.

In addition, the CG data server device 300 can output images of various postures of the robot 400 (pre-substitution object) in an image (hereinafter referred to as "full image") of an unmasked state.

Specifically, the CG data server device 300 stores the 3D model of the robot 400 in advance. Then, as in the case of the snapshot of the character (post-substitution object), the CG data server device 300 acquires the snapshot (2D image) of the full image of the robot 400 based on the joint angle of the robot 400 or the positional relationship between the robot 400 and the user. The full image of the robot 400 (pre-substitution object) output by the CG data server device 300 is used when the image synthesis device 200 generates a synthesized image as will be described later. Also, hereinafter, the full image of the pre-substitution object is referred to as a "non-masking-time image." The CG data server device 300, for example, is implemented by the PC.

The HMD 600 captures a visual field image of the user in the imaging device 610 to transmit the captured visual field image to the image synthesis device 200 and displays a synthesized image from the image synthesis device 200 on the display device 620. Also, although the case in which a video see-through HMD is used as the HMD 600 has been described in this embodiment, the present invention is not limited thereto. For example, an optical see-through HMD may be configured to be used as the HMD 600. Specifically, in this embodiment, the HMD 600 displays a synthesized image on the display device based on an external image captured by the imaging device. In place of this, the HMD 600 may be configured to mask some of external light rays to substitute light rays representing an image of the post-substitution object for the masked external light rays and transmit light rays from the external world for the other part (a region of the image of the masking object or a region of a background image), thereby displaying a synthesized image based on a real image.

The network 700, for example, is a communication network such as a local area network (LAN), and mediates communication of the robot control device 100, the image synthesis device 200, and the CG data server device 300.

Also, this embodiment does not depend upon a communication form of each unit.

Accordingly, the communication scheme of each unit is not limited to the communication scheme illustrated in FIG. 1, and various communication schemes can be used as the communication scheme of each unit. For example, the image synthesis device 200 and the sensor 500 may perform communication wirelessly. In addition, the robot control device 100 and the robot 400 may be configured to perform communication through a wired connection. Likewise, the image synthesis device 200 and the HMD 600 may be configured to perform communication through a wired connection.

In addition, the robot control device 100 and the image synthesis device 200 may be configured to perform communication directly through a wired or wireless connection without involving the network 700. In addition, the image synthesis device 200 and the CG data server device 300 may be configured to perform communication directly through a wired or wireless connection without involving the network 700. In addition, the robot control device 100 and the robot 400, or the image synthesis device 200 and the sensor 500, or the image synthesis device 200 and the HMD 600 may be configured to perform communication via the network 700.

Also, although the robot control device 100, the image synthesis device 200, and the CG data server device 300 are implemented by separate devices in this embodiment, all of two or three of the devices may be configured to be implemented in one device (for example, one PC).

Next, with reference to FIG. 5, a configuration of the image synthesis device 200 will be described in further detail.

Figure 5:
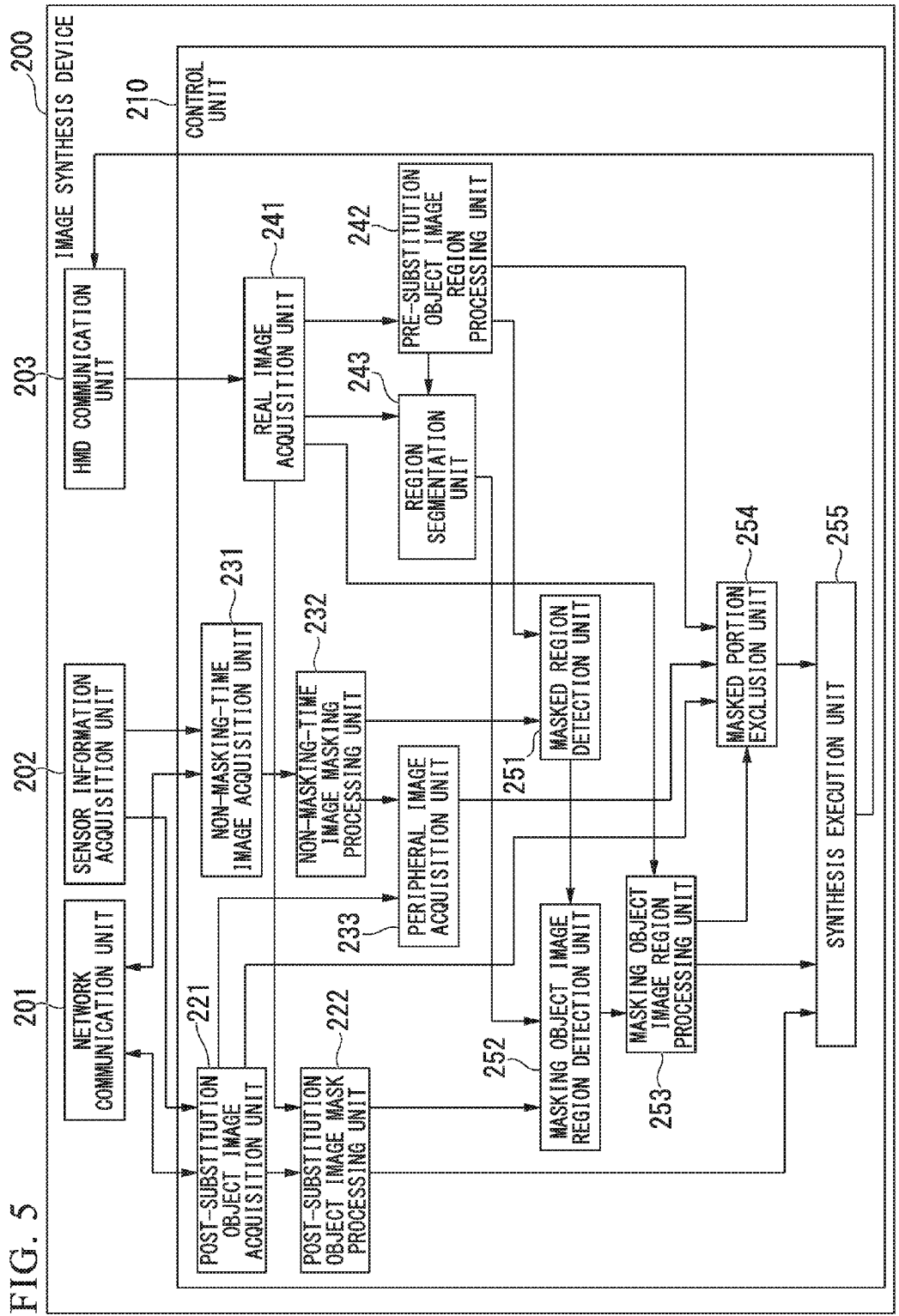
FIG. 5 is a schematic block diagram illustrating a functional configuration of the image synthesis device in the embodiment.

FIG. 5 is a schematic block diagram illustrating a functional configuration of the image synthesis device 200. In FIG. 5, the image synthesis device 200 includes a network communication unit 201, a sensor information acquisition unit 202, an HMD communication unit 203, and a control unit 210. The control unit 210 includes a post-substitution object image acquisition unit 221, a post-substitution object image mask processing unit 222, a non-masking-time image acquisition unit 231, a non-masking-time masking processing unit 232, a peripheral image acquisition unit 233, a real image acquisition unit 241, a pre-substitution object image region processing unit 242, a region segmentation unit 243, a masked region detection unit 251, a masking object image region detection unit 252, a masking object image region processing unit 253, a masked portion cut-out unit 254, and a synthesis execution unit 255.

The network communication unit 201 is connected to the network 700, and acquires various types of data by communicating with the robot control device 100 or the CG data server device 300.

The sensor information acquisition unit 202 acquires sensor information by communicating with the sensor 500.

The HMD communication unit 203 acquires data of a real image captured by the imaging device 610 by communicating with the HMD 600 and transmits synthesized image data to be displayed on the display device 620.

The control unit 210 executes image synthesis by controlling each unit of the image synthesis device 200. The control unit 210, for example, is implemented by a central processing unit (CPU) provided in the PC serving as the image synthesis device 200 reading a program from a storage device provided in the PC and executing the read program. Each of the control unit 210, for example, is configured as a module (for example, a sub-routine) of a program to be executed by the control unit 210.

The post-substitution object image acquisition unit 221 acquires a post-substitution object image that is substituted for a pre-substitution object image included in the real image and synthesized with the real image. Specifically, the post-substitution object image acquisition unit 221 first calculates a posture of the robot 400 viewed by the user based on sensor information acquired by the sensor information acquisition unit 202. Then, the post-substitution object image acquisition unit 221 transmits information of the calculated posture to the CG data server device 300 via the network communication unit 201, and acquires the post-substitution object image (an image of a character in this embodiment) corresponding to the posture from the CG data server device 300. Further, the post-substitution object image acquisition unit 221 superimposes the acquired character image on the image of the robot 400 in the real image by performing position alignment and size adjustment (enlargement/reduction). More specifically, the post-substitution object image acquisition unit 221 superimposes the character image so that the size of the character image is equal to the size of the image of the robot 400 based on a dimension of part of a body such as a height or a shoulder width and coordinates of the character within the space coincide with coordinates of the robot 400. It is possible to superimpose the character image on the entire image of the robot 400 (conceal the image of the robot 400) by employing a robot that is thinner (slightly smaller) than the post-substitution object as the robot 400.

The post-substitution object image mask processing unit 222 generates a mask according to the post-substitution object image acquired by the post-substitution object image acquisition unit 221 or applies the generated mask to the real image. The non-masking-time image acquisition unit 231 acquires the image of the pre-substitution object when there is no masking by the image of the masking object. Specifically, as described above, the CG data server device 300 can output full images of various postures of the robot 400 (pre-substitution object). In addition, like the post-substitution object image acquisition unit 221, the non-masking-time image acquisition unit 231 calculates the posture of the robot 400 viewed by the user based on the sensor information acquired by the sensor information acquisition unit 202. Then, the non-masking-time image acquisition unit 231 transmits information of the calculated posture to the CG data server device 300 via the network communication unit 201 and acquires a full image of the robot 400 corresponding to the posture from the CG data server device 300. Further, the non-masking-time image acquisition unit 231 superimposes the acquired image of the robot 400 on the image of the robot 400 in the real image by performing position alignment and size adjustment on the acquired image (superimposes the images so that an image other than a portion masked by the user's hand is consistent).

The non-masking-time masking processing unit 232 masks the image of the pre-substitution object acquired by the non-masking-time acquisition unit 231. The peripheral image acquisition unit 233 acquires (generates) an image of a portion other than a portion superimposed on the image (non-masking) of the pre-substitution object from the post-substitution object image by applying the mask generated by the non-masking-time image masking processing unit 232 to the post-substitution object image acquired by the post-substitution object image acquisition unit 221.

The real image acquisition unit 241 acquires the real image captured by the imaging device 610 via the HMD communication unit 203.

The pre-substitution object image region processing unit 242 extracts a region (monochromatic region) of the pre-substitution object image included in the real image acquired by the real image acquisition unit 241 and generates the mask based on the extracted region.

The region segmentation unit 243 segments the real image into regions by performing edge extraction (differential processing) on the real image. The region segmentation unit 243 performs the edge extraction, so that a region of an image of the same object may be detected as the same region even when the color of the same object is varied by gradation or shade.

The masked region detection unit 251 detects a region (a region masked by the image of the user's hand in the example of FIG. 2) masked by an image of a masking object from a pre-substitution object image by obtaining a difference between a pre-substitution object image when there is no masking by the masking object image and a pre-substitution object image excluding a portion masked by the masking object image.

The masking object image region detection unit 252 detects a region of the masking object image that masks the pre-substitution object image in the real image. Specifically, the masking object image region detection unit 252 detects a region (a region of the image of the user's hand in the example of FIG. 2) in which at least a part masks the pre-substitution object image among the regions into which the region segmentation unit 243 segments the image as a region of the masking object image. Further, specifically, the masking object image region detection unit 252 detects a region including a region masked by the image of the masking object in the pre-substitution object image detected by the masked region detection unit 251 among the regions into which the real image is segmented.

The masking object image region processing unit 253 performs a process of extraction (generation of a partial image for synthesis) from the real image or masking on the image of the masking object detected by the masking object image region detection unit 252. The masked portion cut-out unit 254 cuts out a portion corresponding to the region of the image of the masking object from the post-substitution object image. Here, a portion corresponding to a region of the image of the masking object in the post-substitution object image is a portion masked by the image of the masking object in a synthesized image in the post-substitution object image.

Specifically, the masked portion cut-out unit 254 generates an image excluding a portion corresponding to the region of the image of the masking object for each of an image of a portion to be substituted for an image of the pre-substitution object and its peripheral images from the post-substitution object image. That is, the masked portion cut-out unit 254 generates an image of a portion corresponding to the pre-substitution object image excluding a portion masked by the masking object image from the post-substitution object image and an image of a portion excluding a portion corresponding to the pre-substitution object image and a portion corresponding to the masking object image from the post-substitution object image.

The synthesis execution unit 255 performs synthesis of the image of the post-substitution object excluding the portion corresponding to the region of the image of the masking object with the real image. A specific example of a process to be performed by the synthesis execution unit 255 will be described later.

Next, with reference to FIGS. 6 and 7, an operation of the image synthesis device 200 will be described.

Figure 6:
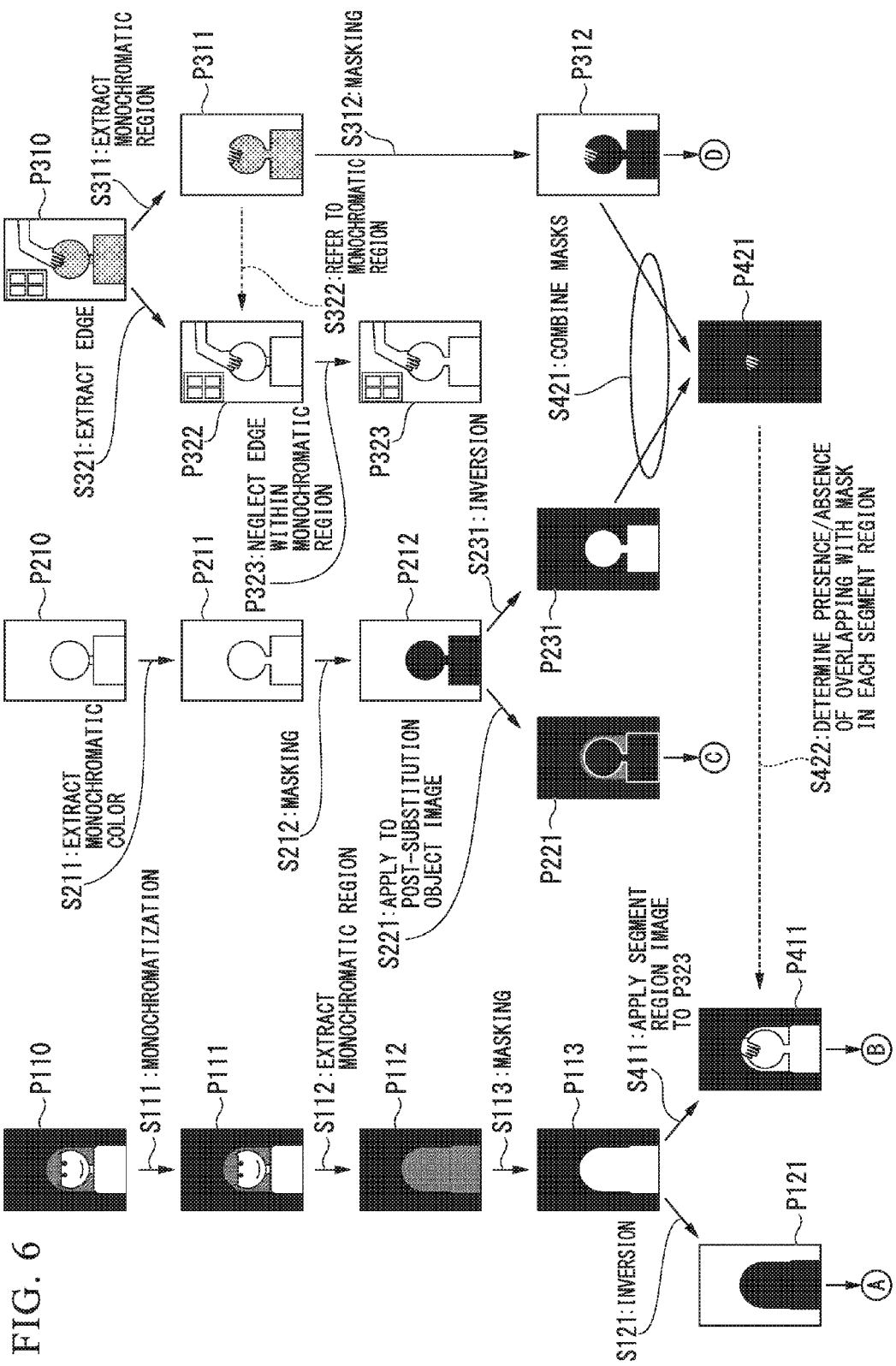
FIG. 6 is an explanatory diagram illustrating a processing procedure in which the image synthesis device generates a synthesized image in the embodiment.
Figure 7:
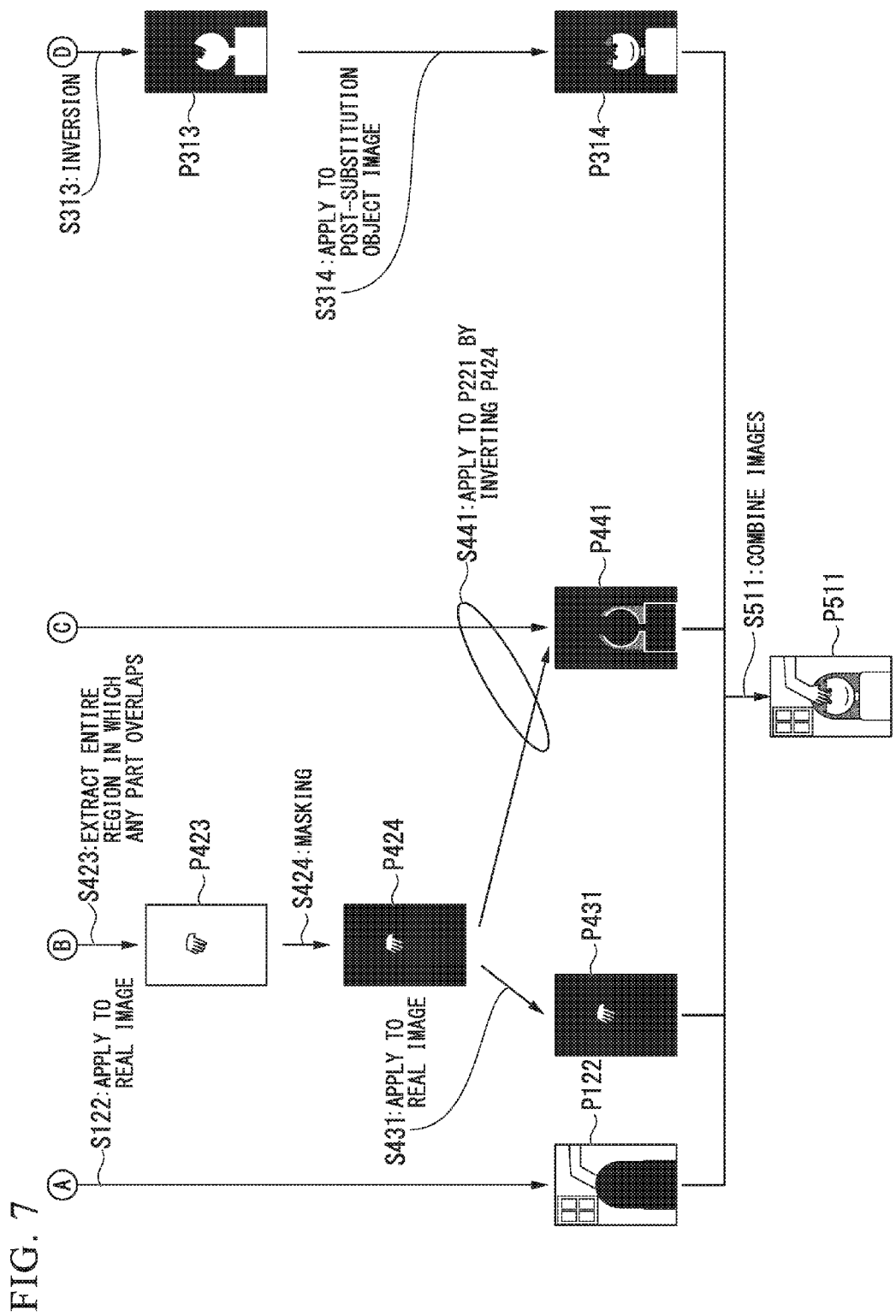
FIG. 7 is an explanatory diagram illustrating a processing procedure in which the image synthesis device generates a synthesized image in the embodiment.

FIGS. 6 and 7 are explanatory diagrams illustrating a processing procedure in which the image synthesis device 200 generates a synthesized image. For example, every time a real image P310 (moving-image frame) is received from the HMD communication unit 203, the image synthesis device 200 performs the process of FIGS. 6 and 7. At this time, the post-substitution object image acquisition unit 221 acquires an image P110 (a character image in this embodiment) of the post-substitution object from the CG data server device 300, and the non-masking-time image acquisition unit 231 acquires a non-masking-time image P210 (a full image of the robot 400 in this embodiment) from the CG data server device 300.

In the process of FIGS. 6 and 7, the post-substitution object image mask processing unit 222 first performs monochromatization on the image P110 of the post-substitution object acquired by the post-substitution object image acquisition unit 221 and generates an image P111 (step S111). Next, the post-substitution object image mask processing unit 222 generates an image P112 by extracting a monochromatic region from the monochromatized image P111 (step S112). The image P112 is segmented into a region of the post-substitution object image and a background region (a region set as non-background in the post-substitution object image P110).

Next, the post-substitution object image mask processing unit 222 generates a mask P113 by masking the image P112 (step S113). In the mask P113, the background region is masked (set without any image), and the region of the post-substitution object image is not masked (set to have an image).

However, a method in which the image synthesis device 200 acquires the mask P113 is not limited to a method of performing the processes of steps S111 to S113. For example, the CG data server device 300 may be configured to synthesize a mask corresponding to the image along with the image of the post-substitution object or pre-stores a CG image of a character (post-substitution object) which is monochromatically painted out to generate a mask from the CG image. Then, the image synthesis device 200 may be configured to acquire the mask from the CG data server device 300 along with the image of the post-substitution object.

Next, the post-substitution object image mask processing unit 222 generates a mask P121 by inverting the mask P113 (step S121). That is, in the mask P121, the region of the image of the post-substitution object is masked and the background region is not masked. Then, the post-substitution object image mask processing unit 222 generates an image P122 by applying the mask P121 to a real image P310 (step S122). This image P122 is used as part of a synthesized image generated by the image synthesis device 200. The image P122 is an image of a portion that is not affected by the post-substitution object image in the real image P310. Accordingly, the image synthesis device 200 (synthesis execution unit 255) can synthesize the image P122 as it is not required to detect the masking relationship.

On the other hand, the non-masking-time masking processing unit 232 first extracts a monochromatic color (a color in which the robot 400 is colored for chroma key processing) for a non-masking-time image P210 acquired by the non-masking-time image acquisition unit 231, and generates an image P211 (step S211). The image P211 is segmented into a region of the non-masking-time image (a region of a full image of the robot 400 serving as the pre-substitution object) and a background region.

Next, the non-masking-time masking processing unit 232 generates a mask P212 by masking the image P211 (step S212). In the mask P212, a region of a non-masking-time image is masked and a background region is not masked.

Then, the peripheral image acquisition unit 233 generates an image P221 by applying the mask P212 to the image P221 of the post-substitution object (step S221). The image P221 is an image of a peripheral region excluding a region corresponding to the image of the pre-substitution object. This peripheral region is a region in which the masking relationship is not shown in the real image and the image synthesis device 200 needs to detect the masking relationship with the real object.

In addition, the masked region detection unit 251 generates a mask P231 by inverting the mask P212 (step S231). That is, in the mask P231, the background region is masked and the region of the non-masking-time image is not masked.

On the other hand, the pre-substitution object image region processing unit 242 acquires an image P311 by extracting a monochromatic region from the real image P310 acquired by the real image acquisition unit 241 (step S311). Specifically, the pre-substitution object image region processing unit 242 detects a region of an unmasked portion of the pre-substitution object image by extracting the region of the color in which the robot 400 is colored for chroma key processing from the real image P310.

Next, the pre-substitution object image region processing unit 242 generates a mask P312 by masking the image P311 (step S312). In the mask S312, a region of the unmasked portion of the pre-substitution object image is masked and the other regions (the background region and the region of the masking object image) are not masked.

Further, the pre-substitution object image region processing unit 242 generates a mask 313 by inverting the mask P312 (step S313). That is, in the mask P313, a region of the unmasked portion of the pre-substitution object image is not masked and the other regions (the background region and the region of the masking object image) are masked.

Then, the masked portion cut-out unit 254 generates an image P314 by applying the mask P313 to the image P110 of the post-substitution object. The image P314 is an image of a region in which the masking relationship is shown in the real image (a region which is not affected by the masking object). Accordingly, the image synthesis device 200 (synthesis execution unit 255) can synthesize the image P314 as it is not required to detect the masking relationship.

On the other hand, the region segmentation unit 243 acquires an image P322 by extracting an edge from the real image P310 acquired by the real image acquisition unit 241 (step S321).

Then, the region segmentation unit 243 refers to the image P311 of a monochromatic region generated by the pre-substitution object image region processing unit 242 (step S322), and generates an image P323 by neglecting (deleting) an edge within the monochromatic region in the image P322 of the edge (step S323).

On the other hand, the masked region detection unit 251 generates a mask P421 by combining the mask P231 generated in step S231 with the mask P312 generated by the pre-substitution object image region processing unit 242 (step S421). In the mask P421, only a portion in which the pre-substitution object image is masked by the masking object image is set to a non-mask and the other regions (a region in which the pre-substitution object image is not masked and the background region) are masked. That is, the masked region detection unit 251 detects a portion in which the pre-substitution object image is masked by the masking object image in the real image P310 by generating the mask P421.

On the other hand, the masking object image region detection unit 252 generates an image P411 by applying the mask P113 generated by the post-substitution object image mask processing unit 222 to the image P323 (segment region image) generated by the region segmentation unit 243. The image P411 is an image representing a region segment of a portion (a portion corresponding to the post-substitution object image) in which the masking relationship may be problematic in the real image P310.

Next, the masking object image region detection unit 252 determines the presence/absence of overlapping with (a non-mask region in) a mask P421 in each region of the image P411 (step S422). Then, the masking object image region detection unit 252 generates an image P423 by extracting the entire region having any part overlapping with (a non-mask region in) the mask P421 among regions of the image P411 (step S423). That is, the masking object image region detection unit 252 detects (a portion corresponding to the post-substitution object image in) a region of the masking object image based on a region in which the image of the masking object masks the pre-substitution object image region detected by the masked region detection unit 251.

Then, the masking object image region processing unit 253 generates a mask P424 by masking the image P423 (step S424). In the mask P424, (a portion corresponding to the post-substitution object image in) the region of the masking object image is not masked and the other regions (a portion that is not masked by the masking object image in a region of the post-substitution object and the background region) are masked.

In addition, the masking object image region processing unit 253 generates an image P431 by applying the mask P424 to the real image P310 (step S431). The image P431 is (a portion corresponding to the post-substitution object image in) the masking object image.

In addition, the masked portion cut-out unit 254 generates an image P441 by inverting the mask P424 and applying the inverted mask to the image P221 generated by the peripheral image acquisition unit 233 (step S441). The image P441 is an image obtained by excluding a portion masked by the masking object from a peripheral portion in the post-substitution object image. That is, if the image P441 and the image P314 are combined, an image of a portion which is not masked by the masking object is obtained from the post-substitution object image.

Then, the synthesis execution unit 255 generates a synthesized image P511 by combining the image P122, the image P314, the image P431, and the image P441 (step S511). Thereby, an image representing a natural masking relationship in which the masking relationship between the pre-substitution object and the masking object is also reflected in the peripheral portion of the post-substitution object (a portion other than a portion associated with the region of the pre-substitution object image) is obtained.

Next, with reference to FIGS. 8 to 10, aspects to which the image synthesis system 1 is applied will be described.

Figure 8:
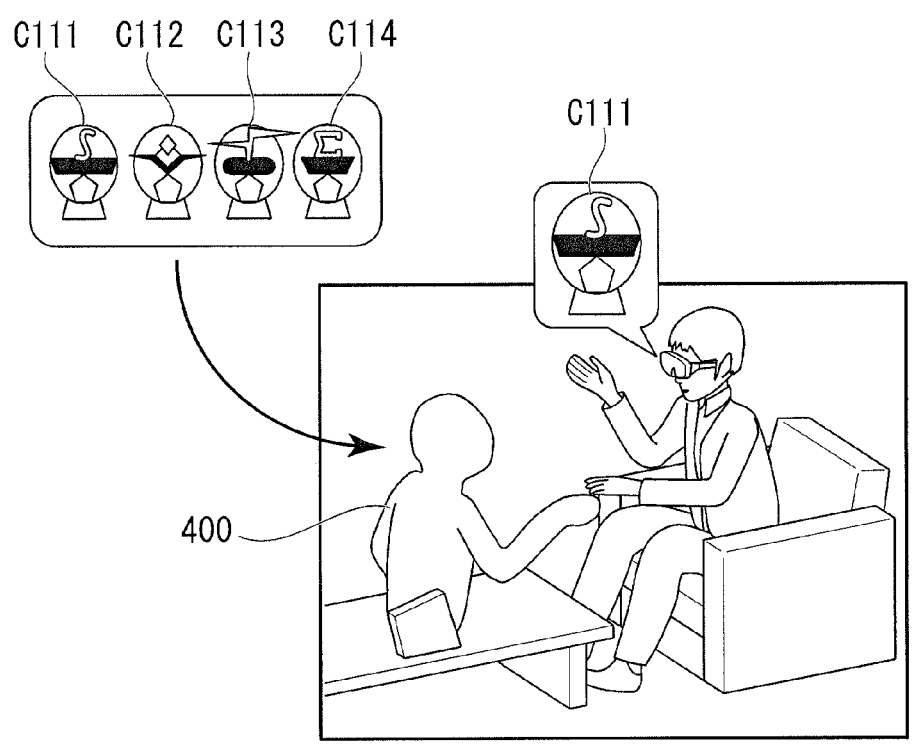
FIG. 8 is an explanatory diagram illustrating an example of a first aspect to which the image synthesis system in the embodiment is applied.

FIG. 8 is an explanatory diagram illustrating an example of a first aspect to which the image synthesis system 1 is applied. In the aspect illustrated in FIG. 8, the image synthesis system 1 (CG data server apparatus 300) synthesizes image data of a plurality of characters as the post-substitution object.

In the example of FIG. 8, the CG data server device 300 pre-stores a 3D model for each of four characters C111 to C114 and can output a snapshot (2D image) viewed by a user from an arbitrary point of view for images of various postures. Then, the image synthesis system 1 presents a synthesized image to the user by synthesizing an image of a character (a character C111 in the example of FIG. 8) selected by the user (by performing the substitution from the image of the robot 400).

In the image synthesis system 1, the user can create a realistic experience because a peripheral portion of the character is not lost even in the character having a different shape from the robot 400.

Also, the robot 400 may be automatically controlled or a person other than the user may control the robot 400 in a remote operation.

In addition, the CG data server device 300 may have a sharable form such as a form in which the CG data server device 300 is on the Internet.

Figure 9:
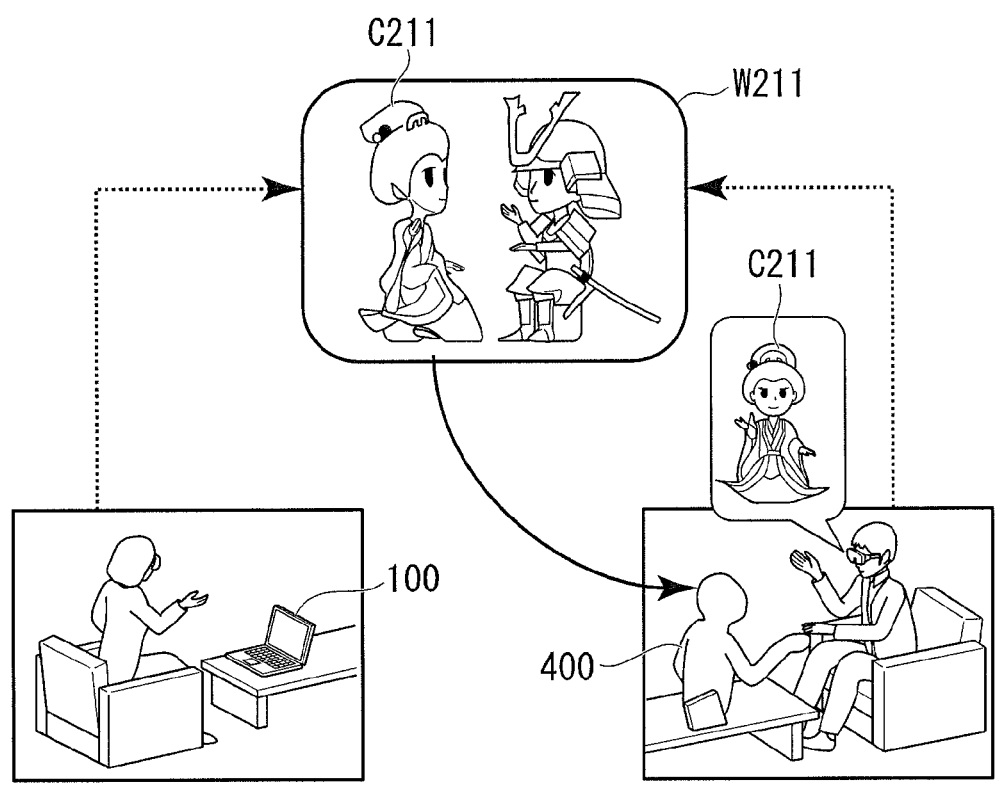
FIG. 9 is an explanatory diagram illustrating an example of a second aspect to which the image synthesis system in the embodiment is applied.

FIG. 9 is an explanatory diagram illustrating an example of a second aspect to which the image synthesis system 1 is applied. In the aspect illustrated in FIG. 9, the user and a conversation partner log in to an avatar service (for example, a virtual world service) and perform conversation between avatars.

The image synthesis system 1 synthesizes an image of a character C21 serving as the avatar of the conversation partner with a real image and presents the synthesized image to the user. In the second aspect, the conversation partner remotely operates the robot 400 using the PC as the robot control device 100. The user can enjoy the conversation with the avatar of the conversation partner with a realistic sensation.

Also, a world W211 in which a character C211 serving as an avatar of a conversation partner and (the avatar of) the user perform the conversation may be a virtual world or a real space such as a room of the user.

Figure 10:
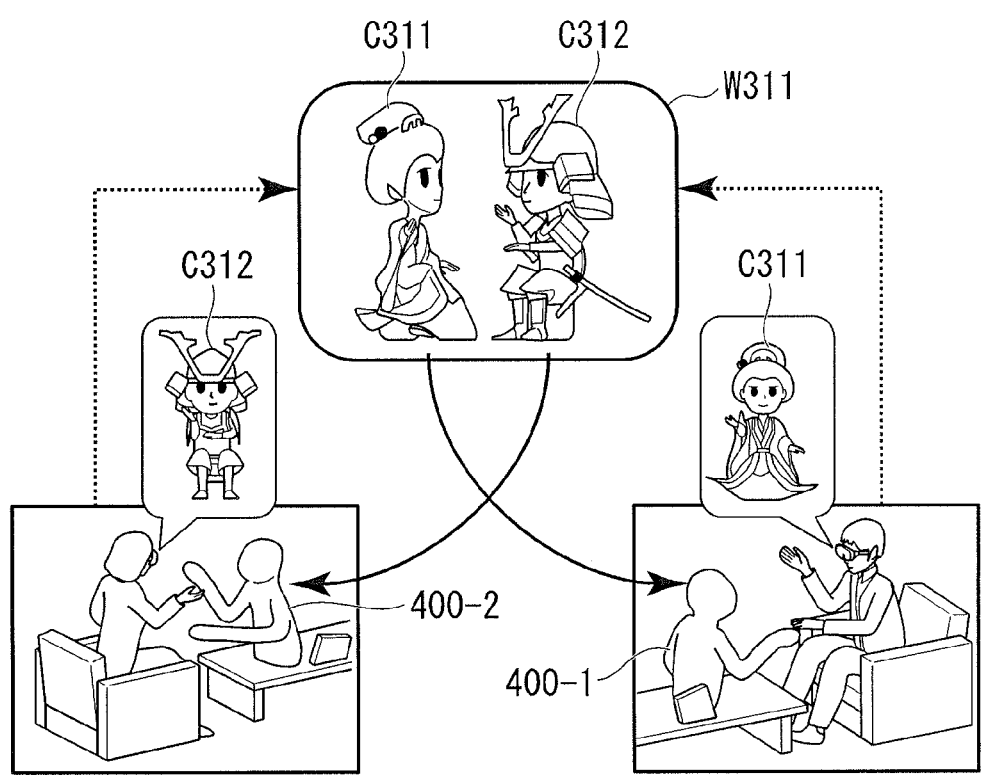
FIG. 10 is an explanatory diagram illustrating an example of a third aspect to which the image synthesis system in the embodiment is applied.
Figure 11:
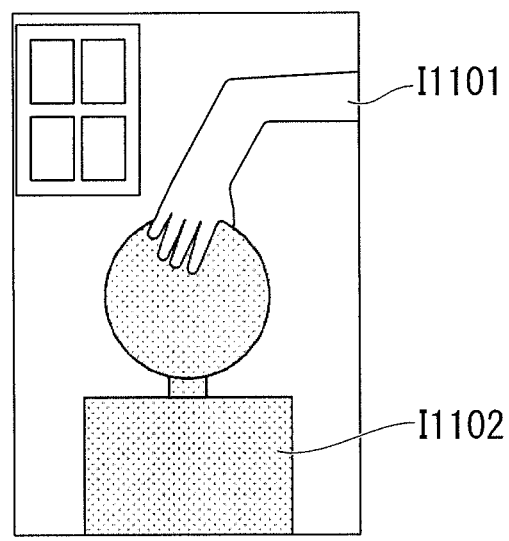
FIG. 11 is an explanatory diagram illustrating an example of a real image.
Figure 12:
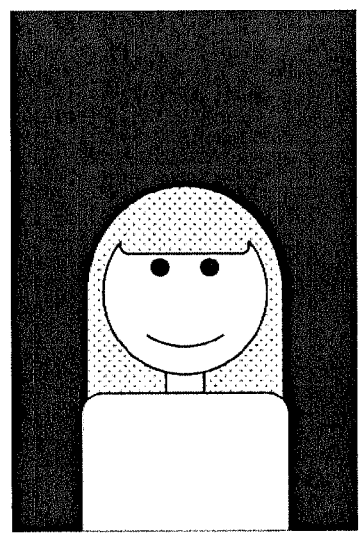
FIG. 12 is an explanatory diagram illustrating an example of a human image to be synthesized with the real image.
Figure 13:
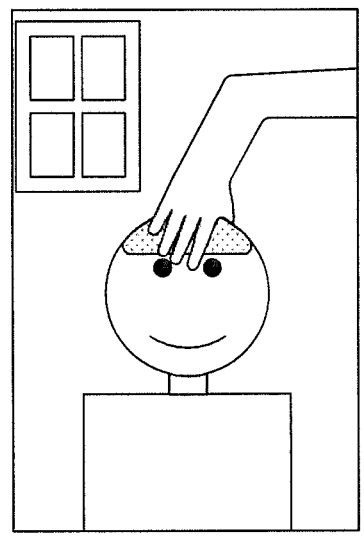
FIG. 13 is an explanatory diagram illustrating an example of an image obtained from a synthesis result.

FIG. 10 is an explanatory diagram illustrating an example of a third aspect to which the image synthesis system 1 is applied. As in the case of the example of FIG. 9, in the aspect of FIG. 10, the user and the conversation partner log in to the avatar service (for example, a virtual world service) and perform conversation between avatars (avatars C311 and C312). On the other hand, in the example of FIG. 10, unlike the case of FIG. 9, both the user and the conversation partner have robots (robots 400-1 and 400-2).

In this case, the image synthesis system 1 synthesizes an image as if each avatar were transferred to a partner's robot. Thereby, the user or the conversation partner can enjoy conversation between avatars with a more realistic sensation.

Also, a world W311 in which the avatar C311 of the conversation partner and the avatar C312 of the user converse may be a virtual world or a real space such as each other's rooms (the user's room and the conversation partner's room).

Also, as the purpose of use of the image synthesis system 1, various purposes of use are considered in addition to entertainment such as experience of a character or conversation using an avatar. For example, it is possible to construct educational content such as that a rock star appears to teach guitar.

Alternatively, for medical use, the image synthesis system 1 may also be considered to be used for treatment of anthropophobia. In addition, it is also possible to use the image synthesis system 1 as a simulated patient for training the actions of a doctor for the patient.

As described above, the masking object image region detection unit 252 detects a region of a masking object image. Then, the masked portion cut-out unit 254 cuts out a portion corresponding to the region of the masking object image from the post-substitution object image. Then, the synthesis execution unit 255 synthesizes the image of the post-substitution object excluding the portion corresponding to the region of the masking object image with the real image (images P122 and P431 in the example of FIG. 7). Thereby, the image synthesis device 200 can find the masking relationship between the post-substitution object image and the masking object image by finding the masking relationship between the pre-substitution object image and the masking object image. Accordingly, in the image synthesis system 1, it is possible to perform image synthesis according to a masking relationship of an object at a comparatively low cost without requiring a device of TOF or the like. Also, in the image synthesis system 1, it is possible to further reduce an uncomfortable feeling for the observer because it is unnecessary to perform a halo display for compensating for a difference between the pre-substitution object and the post-substitution object.

In addition, the image synthesis system 1 generates a synthesized image without using color information about a color of the user's hand or the like. In this point, the image synthesis system 1 has high versatility.

In addition, in the image synthesis system 1, the pre-substitution object such as the robot does not need to be enlarged for the post-substitution object such as a character. Accordingly, a degree of freedom in design of the pre-substitution object such as the robot increases. In addition, even for the post-substitution object (an image to be synthesized), the constraint of a shape such as a short haircut along with the shape of the robot becomes unnecessary. That is, the degree of freedom of the shape for the post-substitution object is increased.

In addition, the region segmentation unit 243 segments the real image into regions by performing edge extraction on the real image. Then, the masking object image region detection unit 252 detects a region having at least a part masking the image of the pre-substitution object as the region of the masking object image among the regions obtained by segmentation of the region segmentation unit 243.

Thereby, the masking object image region detection unit 252 can more accurately find the masking relationship between the post-substitution object image in the synthesized image and the masking object.

In addition, the masked region detection unit 251 detects a region masked by the masking object image from the pre-substitution object image by obtaining a difference between the pre-substitution object image when there is no masking by the masking object image and the pre-substitution object image excluding a portion masked by the masking object image. Then, the masking object image region detection unit 252 detects a region including the region detected by the masked region detection unit 251 among the regions into which the real image is segmented.

Thereby, the image synthesis system 1 can detect the masking relationship in the synthesized image in simple image processing and determination such as a combination of masks in step S421 of FIGS. 6 and 7 and detection of an overlapping region in steps S422 and S423.

In addition, the masked portion cut-out unit 254 generates an image of a portion corresponding to the post-substitution object image excluding a portion masked by the masking object image from a post-substitution object image and an image of a portion excluding the portion corresponding to the pre-substitution object image and the portion corresponding to the masking object image from the post-substitution image. Here, it is only necessary to synthesize the post-substitution object image as it is not required to re-obtain the masking relationship between the post-substitution object and the masking object for a portion corresponding to the image of the pre-substitution object excluding the portion masked by the masking object image. Accordingly, it is only necessary for the masked portion cut-out unit 254 to detect the masking relationship with the masking object for a region around the pre-substitution object image among regions of the post-substitution object image.

Also, the application range of the present invention is not limited to a configuration using the above-described HMD. For example, the present invention is applicable to various configurations in which a front-rear relation between the robot and the object occurs such as a configuration in which a display is performed on a fixed screen by a fixed camera. Alternatively, as the display device in the present invention, a smartphone or a PC display can also be used.

Also, processing of each unit may be performed by recording a program for implementing all or some of the functions of the control unit 210 on a computer-readable recording medium and causing a computer system to read and execute the program recorded on the recording medium. Also, the "computer system" used here is assumed to include an operating system (OS) and hardware such as peripheral devices.

In addition, the computer system is assumed to include a homepage providing environment (or displaying environment) when a World Wide Web (WWW) system is used.

In addition, the computer-readable recording medium refers to a storage device, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. In addition, the above-described program may be used to implement some of the above-described functions. Further, the program may implement the above-described functions in combination with a program already recorded on the computer system.

Although the embodiments of the present invention have been described in detail above with reference to the drawings, specific configurations are not limited to the embodiments, and a design change, etc. may also be included without departing from the scope of the present invention.

INDUSTRIAL APPLICABILITY

The present invention relates to an image synthesis device including: a real image acquisition unit configured to acquire a real image; a post-substitution object image acquisition unit configured to acquire a post-substitution object image that is substituted for a pre-substitution object image included in the real image and synthesized with the real image; a masking object image region detection unit configured to detect a region of a masking object image that masks the pre-substitution object image in the real image; a masked portion cut-out unit configured to cut out a portion corresponding to the region of the masking object image from the post-substitution object image; and a synthesis execution unit configured to perform the synthesis of the post-substitution object image which the portion corresponding to the region of the masking object image has been cut out from the real image.

According to the present invention, it is possible to perform image synthesis corresponding to a masking relationship of an object at a comparatively low cost and further reduce an uncomfortable feeling for an observer.

REFERENCE SIGNS LIST

1 Image synthesis system
100 Robot control device
200 Image synthesis device
201 Network communication unit
202 Sensor information acquisition unit
203 HMD communication unit
210 Control unit
221 Post-substitution object image acquisition unit
222 Post-substitution object image mask processing unit
231 Non-masking-time image acquisition unit
232 Non-masking-time masking processing unit
233 Peripheral image acquisition unit
241 Real image acquisition unit
242 Pre-substitution object image region processing unit
243 Region segmentation unit
251 Masked region detection unit
252 Masking object image region detection unit
253 Masking object image region processing unit
254 Masked portion cut-out unit
255 Synthesis execution unit
300 CG data server device
400 Robot
500 Sensor
600 Head-mounted display
700 Network

The invention claimed is:

1. An image synthesis device comprising:
at least one processor;
a memory in communication with the at least one processor, the memory storing computer-executable instructions, wherein when executed, the computer-executable instructions cause the at least one processor to at least:
acquire a real image; acquire a post-substitution object image that is substituted for a pre-substitution object image included in the real image and synthesized with the real image;
detect a region of a masking object image that masks the pre-substitution object image in the real image;
cut out a portion corresponding to the region of the masking object image from the post-substitution object image; and
perform the synthesis of the post-substitution object image which the portion corresponding to the region of the masking object image has been cut out from the real image.

2. The image synthesis device according to claim 1, wherein, when executed, the computer-executable instructions further cause the at least one processor to at least segment the real image into regions by performing edge extraction on the real image, and wherein the detected region of the masking object image comprises a region that at least a part of the regions segmented masks the pre-substitution object image.

3. The image synthesis device according to claim 1, wherein, when executed, the computer-executable instructions cause the at least one processor to at least:
acquire the pre-substitution object image when there is no masking by the masking object image; and
detect a region masked by the masking object image from the pre-substitution object image by obtaining a difference between the pre-substitution object image when there is no masking by the masking object image and the pre-substitution object image cutting out a portion masked by the masking object image, wherein the detected region of the masking object image includes the region masked by the masking object image from the pre-substitution object among regions into which the real image is segmented.

4. An image synthesis system comprising:
an imaging device;
an image synthesis device, comprising at least one processor and a memory;
a display device; and
computer-executable instructions executable by the at least on processor, wherein, when executed, the computer-executable instructions cause the at least one processor to at least:
  acquire a real image captured by the imaging device;
  acquire a post-substitution object image that is substituted for a pre-substitution object image included in the real image and synthesized with the real image;
  detect a region of a masking object image that masks the pre-substitution object image in the real image;
  cut out a portion corresponding to the region of the masking object image from the post-substitution object image; and
  perform the synthesis of the post-substitution object image which the portion corresponding to the region of the masking object image has been cut out from the real image, and wherein the display device displays an image synthesized by the synthesis execution unit.

5. An image synthesis method of an image synthesis device, comprising:
a real image acquisition step of acquiring a real image;
a post-substitution object image acquisition step of acquiring a post-substitution object image that is substituted for a pre-substitution object image included in the real image and synthesized with the real image;
a masking object image region detection step of detecting a region of a masking object image that masks the pre-substitution object image in the real image; a masked portion cut-out step of cutting out a portion corresponding to the region of the masking object image from the post-substitution object image; and
a synthesis execution step of performing the synthesis of the post-substitution object image which the portion corresponding to the region of the masking object image has been cut out from the real image.

6. A non-transitory computer readable medium storing a computer program for causing a computer serving as an image synthesis device to execute:
a real image acquisition step of acquiring a real image;
a post-substitution object image acquisition step of acquiring a post-substitution object image that is substituted for a pre-substitution object image included in the real image and synthesized with the real image;
a masking object image region detection step of detecting a region of a masking object image that masks the pre-substitution object image in the real image;
a masked portion out-out step of cutting out a portion corresponding to the region of the masking object image from the post-substitution object image; and
a synthesis execution step of performing the synthesis of the post-substitution object image which the portion corresponding to the region of the masking object image has been cut out from the real image.

* * * * *